(12) United States Patent
Baba

(10) Patent No.: US 7,149,589 B2
(45) Date of Patent: Dec. 12, 2006

(54) METHOD OF ADJUSTING A PROCESS CONTROL DEVICE, ADJUSTMENT TOOL THEREFOR AND PROCESS CONTROL DEVICE THEREOF

(75) Inventor: Yasushi Baba, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 10/876,648

(22) Filed: Jun. 28, 2004

(65) Prior Publication Data

US 2005/0010309 A1     Jan. 13, 2005

(30) Foreign Application Priority Data

Jul. 10, 2003     (JP)     ............... 2003-195309

(51) Int. Cl.
*G05B 13/02*     (2006.01)
(52) U.S. Cl. ........................... 700/28; 700/31
(58) Field of Classification Search ................ 700/28, 700/29, 30, 31, 37, 41, 42, 43, 51
See application file for complete search history.

(56) References Cited

U.S. PATENT DOCUMENTS

| | | | | |
|---|---|---|---|---|
| 4,441,151 A | * | 4/1984 | Hayashibe | ................ 700/37 |
| 6,445,963 B1 | * | 9/2002 | Blevins et al. | ................ 700/44 |
| 6,546,295 B1 | * | 4/2003 | Pyotsia et al. | ................ 700/37 |
| 6,772,074 B1 | * | 8/2004 | Millott et al. | ................ 702/56 |
| 6,810,366 B1 | * | 10/2004 | Kendrick et al. | ........... 702/190 |
| 6,847,954 B1 | * | 1/2005 | Wojsznis et al. | .............. 706/23 |

FOREIGN PATENT DOCUMENTS

JP     2002-157002     5/2002

OTHER PUBLICATIONS

Yasushi Baba, et al., "Model-Driven PID Control System in Single-Loop Controller", SICE Annual Conference in Fukui, Aug. 4-6, 2003, pp. 1276-1279.

* cited by examiner

*Primary Examiner*—Thomas Pham
(74) *Attorney, Agent, or Firm*—Oblon, Spivak, McClelland, Maier & Neustadt, P.C.

(57) ABSTRACT

In a method of adjusting a process control device wherein a closed loop system comprising a control subject and external compensator is approximated by a transfer function expressed by the time constant of a first-order delay filter and a dead time, adjustment is effected by displaying the step response of the closed loop system as a first response, displaying the step response of a model transfer function of the closed loop system as a second response in superimposed fashion with the first response, adjusting the respective parameters so that the difference of the first response and the second response is within a prescribed evaluation standard range, and performing prescribed conversion and setting of this model parameter as a control parameter of the controller, so that the response of the process control device is within a prescribed evaluation standard range.

13 Claims, 7 Drawing Sheets

METHOD OF ADJUSTING A PROCESS CONTROL DEVICE, ADJUSTMENT TOOL THEREFOR AND PROCESS CONTROL DEVICE THEREOF

CROSS-REFERENCE TO RELATED APPLICATION

This application claims benefit priority to Japanese Patent Application No. JP 2003-195309 filed Jul. 10, 2003 the entire content of which is incorporated by reference herein.

BACKGROUND OF THE INVENTION

1. Field of the Invention

The present invention relates to a process control device and method of adjustment thereof that control subjects of control in for example a power-generating plant or typical industrial plants such as petrochemical or iron and steel plants so that a prescribed control performance is obtained and in particular relates to a process control device, method of adjustment thereof and adjustment tool therefor whereby adjustment of the control parameters of control items may be performed in a simple fashion.

2. Description of the Related Art

Conventionally, in order to control the process values of subjects of control such as temperature, flow rate, pressure or liquid level to prescribed values in for example power-generating plants or typical industrial plants (general industrial plants) such as petrochemical or iron and steel plants, a PID control device combining proportional, integral and differential operations was widely employed.

In a conventional PID control device, if the characteristics of the subjects of control are lagging characteristics, excellent control performance may be obtained and many adjustment rules for the control parameters of such PID control devices have been proposed.

However, there is the problem that, if the subjects of control have other types of characteristics such as for example an integral characteristic or oscillatory characteristic, adjustment of the control parameters in order to achieve a good control performance is difficult and, furthermore, in the case where the subjects of control have an unstable characteristic, adjustment of the control parameters becomes even more difficult.

Also, power-generating plants and many typical industrial processes (general industrial process) have the characteristic that, when the input of the subject of control changes, there is a certain time delay (dead time) before the output change takes place. There is therefore the problem that, even if the characteristic of the subject of control is taken to be a delay characteristic, if the dead time is long in comparison with the delay time constant, it is not possible to achieve sufficient control performance with the conventional PID control device.

Recently, therefore, in order to solve such problems, instead of a PID control device, a process control device has been proposed incorporating therein a positive feedback compensator comprising a first-order delay and dead time element. Such a device is disclosed in Laid-open Japanese Patent Publication No. P2002-157002, for example.

FIG. 1 is a block diagram showing an example of the construction of a prior art process control device comprising a positive feedback compensator and an external compensator of this type.

As shown in this Figure, the process control device comprises: a controller 11 that outputs in respect of a control subject (control target) 13 a process value (a control quantity) PV obtained by inputting the deviation e obtained by subtracting, using a subtractor 18, a setpoint value (a control target value) SV and a process value (a control quantity) PV of the control subject 13; an external compensator 12 that inputs the process value (the control quantity) PV of the control subject 13 and outputs a manipulative value in respect of the control subject 13; and a subtractor 14 that generates a final manipulative value (a final target control quantity) MV in respect of the control subject 13 by subtracting the manipulative value that is output by the controller 11 and the manipulative value that is output by the external compensator 12.

The controller 11 also comprises a compensator (positive feedback compensator) 15 comprising first-order delay and dead time, proportionator 16 and adder 17.

The proportionator 16 inputs the deviation e of the setpoint value SV and the process value PV of the control subject 13 and performs a proportional calculation; the adder 17 adds the output of this proportionator 16 and the output of the positive feedback compensator 15 and the manipulative value which is the output of the controller 11 is thereby obtained. The manipulative value which is the output of this controller 11 is fed back to this positive feedback compensator 15 as input.

As described above, the prior art process control device comprises an external compensator 12 in addition to the positive feedback compensator 15 so that not merely control subjects 13 having a long dead time but also control subjects 13 having an oscillatory characteristic or unstable characteristic, that cannot be satisfactorily controlled by PID control, may be satisfactorily controlled.

A process control device having such a positive feedback compensator 15 approximates the control subject 13 as first-order delay and a dead time element and determines the control parameters of the positive feedback compensator 15 by using these parameters.

Consequently, when an external compensator 12 is introduced, the characteristic of the entire closed loop system constituted by the control subject 13 and the external compensator 12 must be approximated as first-order delay and a dead time element.

As a result, every time the parameters of the external compensator 12 are altered, the approximate characteristic of the entire closed loop system constituted by the control subject 13 and the external compensator 12 must be calculated and the parameters of the positive feedback compensator 15 and proportionator 16 altered accordingly.

In order to obtain fully satisfactory control performance, an operation of adjusting this external compensator 12 on site is indispensable and it is necessary to repeat the three procedures:

(a) alteration of the parameters of the external compensator 12;

(b) characteristic approximation calculation of the closed loop system; and (c) alteration of the parameters of the positive feedback compensator 15 and proportionator 16 until the prescribed control performance is obtained.

However, in the case of power-generating plants or typical industrial processes, the subjects of control that must be adjusted may number as many as a few hundred and there is the problem that performing adjustment by repeating the three procedures described above in respect of all of these not only requires a long adjustment time but also may result in mis-setting of the parameters, due to increase in the number of times that the parameters must be altered.

In response to these problems, as shown in FIG. 2, a process control device may be provided comprising in the controller 11 an internal compensator 112 corresponding to the external compensator 12 of the process control device. This internal compensator 112 has a positive feedback compensation function and has the same construction as the external compensator 12 that performs proportional calculation and differential calculation, and the same parameters. The process control device may also comprise a model compensator 113 constituted by a model of the control subject 13, and, in addition, the parameters of the external compensator 12 and internal compensator 112 may be made the same.

Specifically, the construction of the process control device is made such that if, of the parameters of the external compensator 12 and internal compensator 112, either set of parameters is altered, the other set of parameters may also be automatically altered correspondingly, so that parameter alteration may be performed by a single adjustment operation. An example of such a process control device has been disclosed by the inventors of the present application as "Model-Driven PID Control System in Single-Loop Controller".

Control elements having the same function as those described with reference to FIG. 1 are given the same reference symbols and further description thereof is dispensed with.

According to the present invention, it is unnecessary to approximate the characteristic of the closed loop system comprising the control subject 13 and external compensator 12 by a first-order delay and dead time element as illustrated in Laid-open Japanese Patent Publication No. P 2002-157002, so a single parameter alteration operation is sufficient. Consequently, the control subject may be satisfactorily controlled over a wider range in same way as the prior art process control device having a positive feedback compensator 15 shown in FIG. 1 described above and the operation of adjusting the control parameters of for example the external compensator 12, internal compensator 112 and model compensator 113 on site may be performed in a simple fashion.

However, in the latter proposal shown in FIG. 2 also, since the characteristic of the closed loop constituted by the control subject 13 and external compensator 12 is made to be a characteristic having a first-order delay and a dead time, setting of the compensation parameter of the external compensator 12 is performed by calculation, so there is a possibility of miscalculation occurring.

Also, in the case of a process having a large number of control subjects, there is a problem that not only is considerable time required to repeat the calculations individually until the prescribed control performance is obtained and, furthermore, to evaluate such control performance, but also that mistakes may occur in such human operations.

As described above, in power-generating plants and typical industrial processes, the number of control subjects that need to be controlled is extremely large and the characteristics of these control subjects are multifarious. A process control device is therefore demanded whereby the prescribed control performance in respect of control subjects having multifarious characteristics may be satisfactorily achieved.

Also, in order to perform adjustment in a short time and in a safe fashion, it is necessary that it should be possible to perform adjustment of the control parameters reliably by a simple procedure.

The present invention was made in view of the above problems. In a process control device having a positive feedback compensator capable of performing satisfactory control even in cases where the dead time is long compared with the time constant of the control subject or in cases where the characteristic of the control subject is not a lagging characteristic, its object is to provide a method of adjusting a process control device and adjustment tool therefor whereby the operation of on site adjustment of control parameters for obtaining satisfactory control performance may be performed in a short time and the appropriateness of the adjustment and control performance of the control parameters may be evaluated visually and whereby human miscalculation or misadjustment may be prevented.

SUMMARY OF THE INVENTION

Accordingly, one object of the present invention is to provide a novel method of adjustment of a process control device. According to the present invention there is provided a method of adjusting a process control device in which a closed loop system comprising a control subject and an external compensator is approximated by a transfer function expressed by a first-order delay and dead time and this approximated closed loop system is controlled by a controller, wherein:

the transfer function of the control subject is defined by a predetermined transfer function;

the compensation parameter of the external compensator comprising a proportional gain element and an incomplete differentiation element is set in a range such that the step response of the closed loop system of the external compensator does not diverge or oscillate and the compensation parameter is adjusted in a first step in which the step response of the closed loop system is displayed as a first response;

a model transfer function of the closed loop is set as the model parameter of a model transfer function comprising a proportional gain element, dead time and first-order delay element, the step response of the model transfer function is displayed as a second response superimposed on the first response, and adjustment of the model parameter is effected as a second step such that the difference of the first response and the second response is kept within a prescribed evaluation standard range;

the controller is set by performing a prescribed conversion with the model parameter as the control parameter of the controller and the step response of the process transfer function constituted by the control subject, external compensator and controller is displayed as a third response;

whether the response of the process control device is within the prescribed evaluation standard range is evaluated as a third step; and if the third response exceeds the prescribed evaluation standard range, then readjustment is performed by repeating the first step to the third step so as to bring the third response within the evaluation standard range.

A process control device and adjustment method thereof may therefore be provided whereby the adjustment operation may be performed reliably in a simple fashion in a short time since the evaluation of the appropriateness of adjustment of the external compensator and the evaluation of the appropriateness of adjustment of the control parameter of the controller are rendered visible and a quantitative evaluation of control performance may be conducted with a prescribed evaluation criterion.

BRIEF DESCRIPTION OF THE DRAWINGS

A more complete appreciation of the present invention and many of the attendant advantages thereof will be ready obtained as the same becomes better understood by reference to the following detailed description when considered in connection with the accompanying drawings, wherein.

DETAILED DESCRIPTION OF THE PREFERRED EMBODIMENTS

Figure 1:
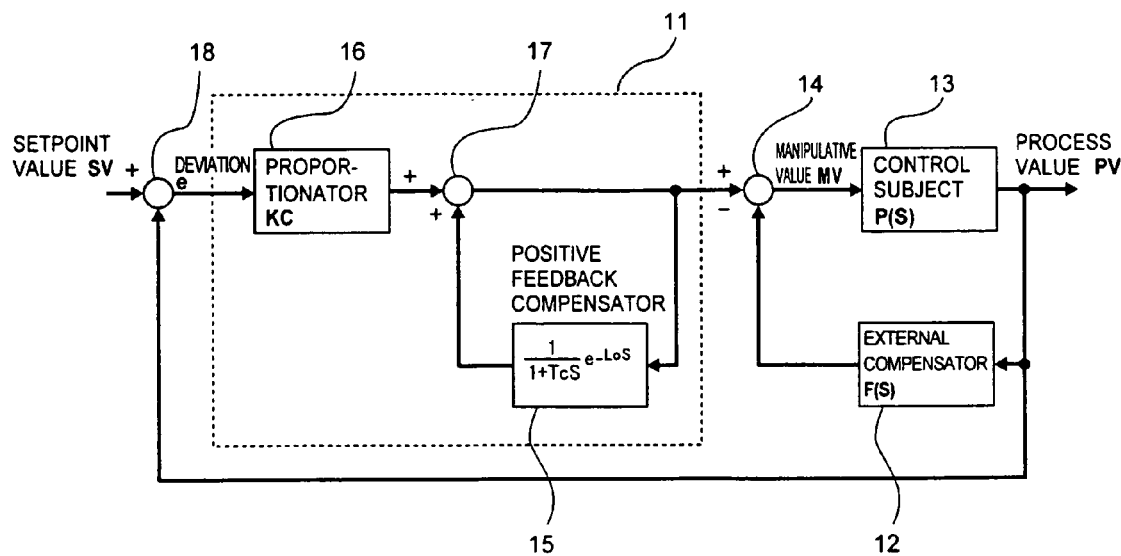
FIG. 1 is a block layout diagram of a conventional process control device wherein compensation is effected such that a subject of control is expressed in terms of a first-order delay and dead time by an external compensator.
Figure 2:
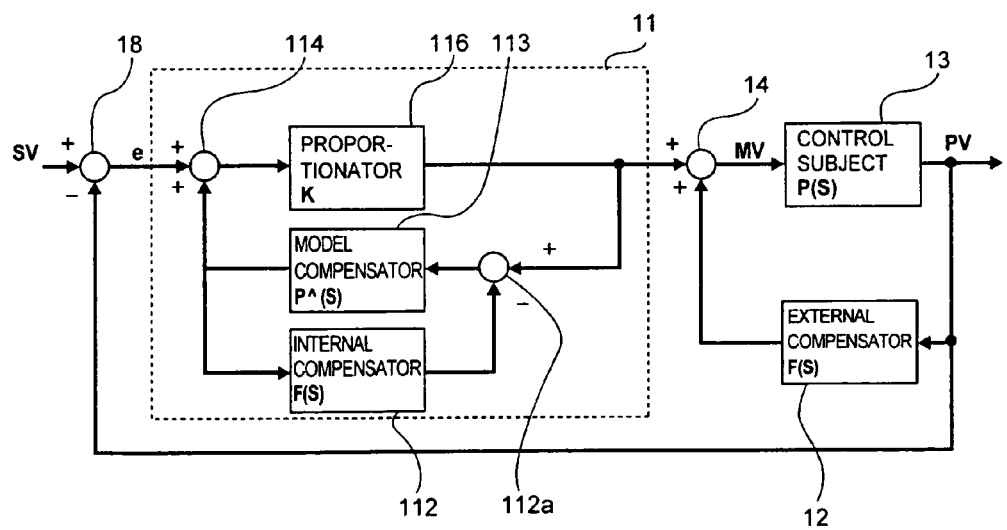
FIG. 2 is a block layout diagram of a process control device comprising an internal compensator of transfer function the same as in a prior art controller.

Referring now to the drawings, wherein like reference numerals designate identical or corresponding parts throughout the several views, and more particularly to FIG. 3 to 9 and FIG. 1 thereof, one embodiment of the present invention will be described.

First of all, as a process control device that is the subject of the present invention, a process control device wherein a closed loop system comprising a control subject and an external compensator is approximated by a first-order delay and dead time is taken as an example; the process control device shown in FIG. 1 described above wherein control is exercised by a controller having a positive feedback compensator comprising a first-order delay and dead time is used in this example. A description of the construction and characteristics of this process control device has already been given with reference to FIG. 1 and so will not be repeated here.

Figure 3A:
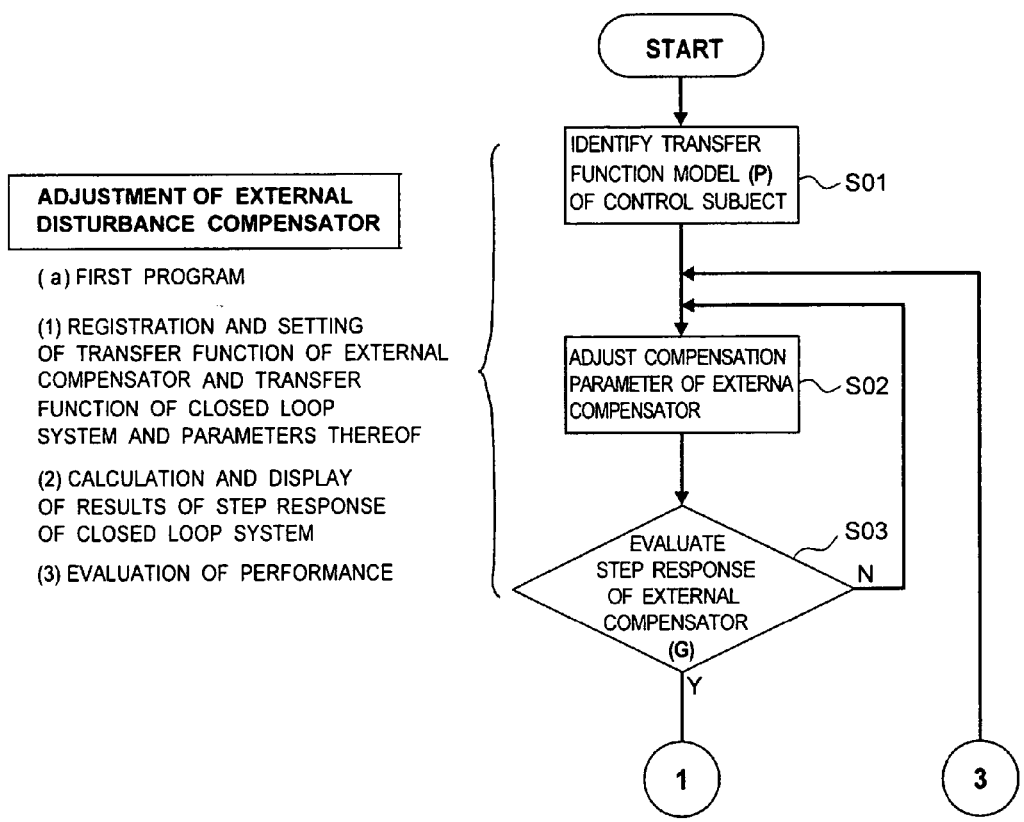
FIG. 3A is a flow chart given in explanation of a method of adjusting a process control device according to the present invention.
Figure 3B:
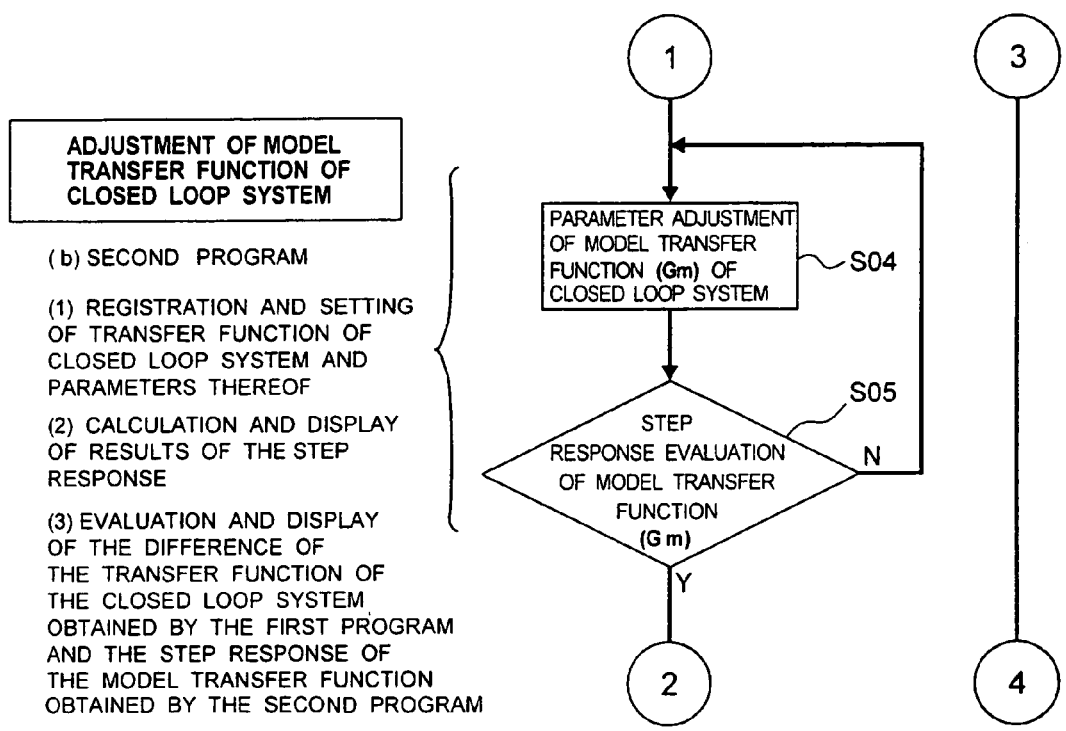
FIG. 3B is a flow chart given in explanation of a method of adjusting a process control device according to the present invention.
Figure 3C:
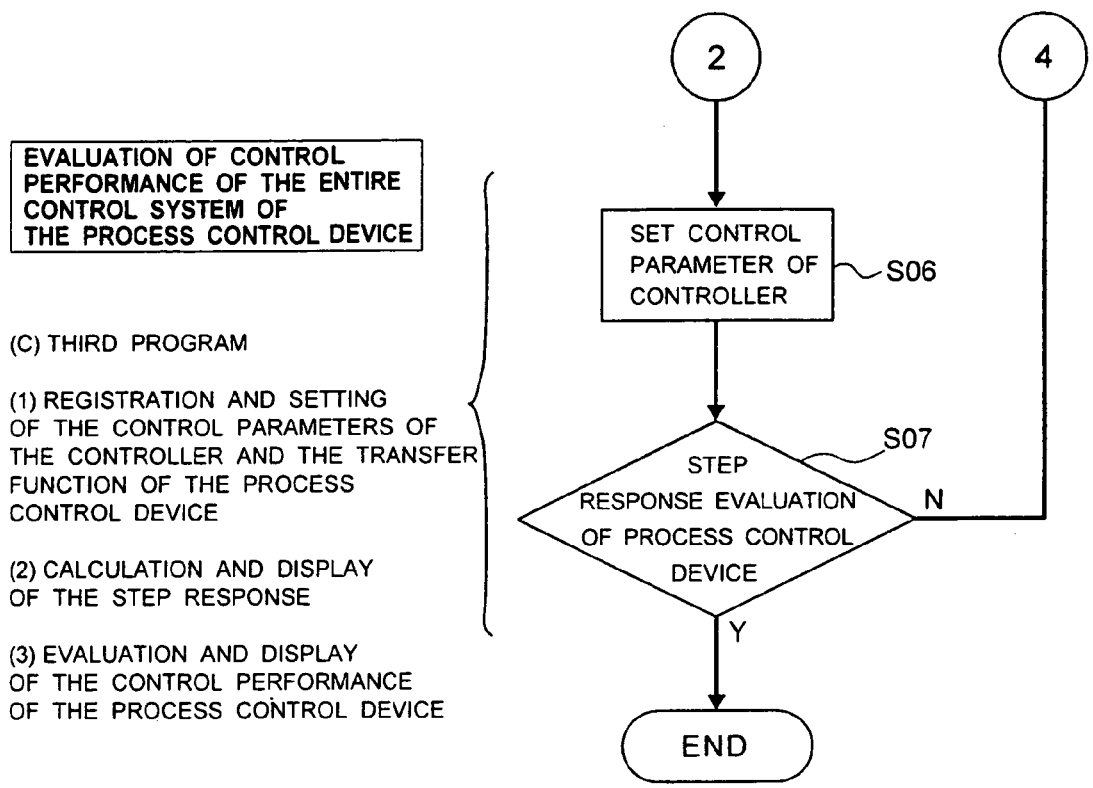
FIG. 3C is a flow chart given in explanation of a method of adjusting a process control device according to the present invention.
Figure 4:
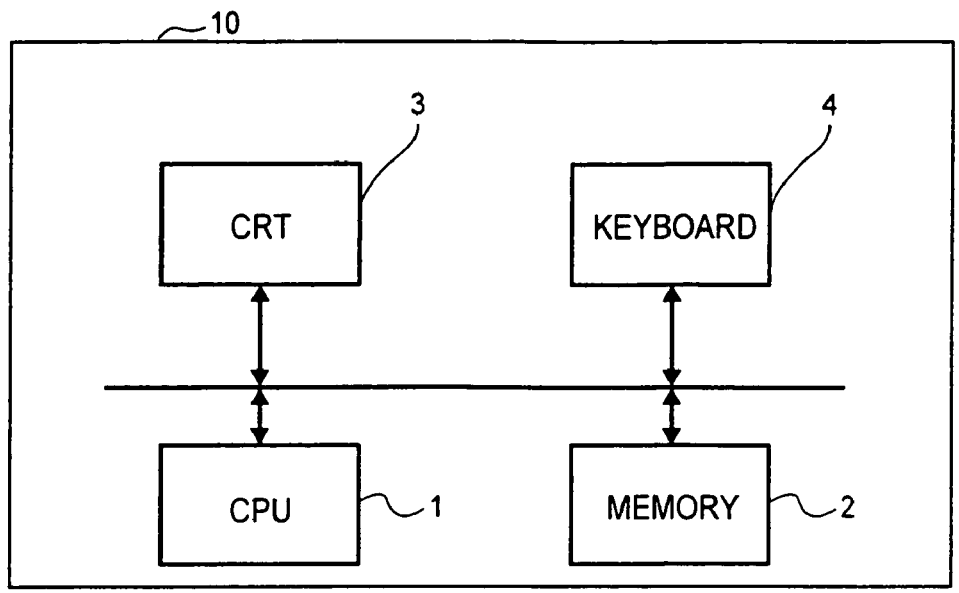
FIG. 4 is a layout diagram of an adjustment tool for a process control device according to the present invention.

FIG. 3A, FIG. 3B and FIG. 3C are flow charts given in explanation of a method according to the present invention of adjusting a process control device comprising a controller having a positive feedback construction wherein a closed loop comprising a control subject and external compensator is approximated by a first-order delay and dead time. FIG. 4 is a layout diagram of an adjustment tool for performing this adjustment.

FIG. 3A, FIG. 3B and FIG. 3C describe the adjustment tool 10 described with reference to FIG. 4 and the adjustment procedure that is performed by simulation programs incorporated in the adjustment tool 10. First of all, the construction of this adjustment tool 10 and the function of the simulation programs will be described with reference to FIG. 4. After this, the adjustment procedure will be described using the flow charts of FIG. 3A, FIG. 3B and FIG. 3C.

In FIG. 4, the adjustment tool 10 is implemented by for example an ordinary personal computer and is used to set the parameters and transfer function of the control system and the control elements constituting the process control device: it comprises a CPU 1 that calculates and controls the respective step responses, memory 2 that incorporates the simulation programs thereof, a CRT 3 that displays the respective step responses and set parameters, and a keyboard 4 that sets the adjustment parameters and transfer function of the control system and control elements constituting the process control device.

Also, the simulation programs loaded in the memory 2 are constituted by programs that perform (a) compensation parameter adjustment of the external compensator;

(b) model parameter adjustment of the model transfer function of the closed loop system; and (c) control performance evaluation of the process control device.

These respective programs have the following functions.

In FIG. 3A, FIG. 3B and FIG. 3C, (a) the simulation program that performs adjustment of the compensation parameters of the external compensator comprises registration and setting functions of the transfer function of the external compensator 12 of FIG. 1 and the compensation parameters thereof and evaluation and display functions of the control performance thereof and calculation and display of the step response of the closed loop system constituted by the external compensator 12 and the control subject 13 and evaluation and display functions of the control performance thereof.

Also, in FIG. 3A, FIG. 3B and FIG. 3C, (b) the simulation program that performs adjustment of the model parameters of the model transfer function of the closed loop system comprises registration and setting functions of the transfer function of the closed loop system constituted by the control subject 13 and external compensator 12 and model parameters thereof, calculation and display functions of the step response of the model transfer function and evaluation and display functions for display of the difference with the step response of the closed system in (a) described above.

Also, in FIG. 3A, FIG. 3B and FIG. 3C, (c) the simulation program that performs control performance evaluation of the process control device comprises registration and setting functions of the transfer function of the controller 11 and the control parameters thereof, calculation and display functions for calculation of the transfer function of the process control device and the step response thereof, and evaluation and display functions of the control performance of the process control device.

Next, a method of adjusting a process control device according to the present embodiment constructed as described above will be described again referring to FIG. 3A, FIG. 3B and FIG. 3C. The items of adjustment may be roughly divided into two:
- (A) adjustment of the compensation parameters of the external compensator 12; and
- (B) model parameter adjustment of the model transfer function in the closed loop system comprising the control subject 13 and external compensator 12.

Control performance is then evaluated by performing simulation using the control parameters of the control system controller 11 of the entire process control device, using the results of the above adjustment process.

The above adjustment procedures are described with reference to these Figures: the adjustment procedure of the compensation parameters of the external compensator 12 is described in step S01 to step S03; the adjustment procedure of the model parameters of the model transfer function is described in step S04 and step S05; and the performance evaluation of the process control device is described in step S06 and step S07.

Adjustment of the external compensator is performed by starting up the first program. First of all, the transfer function model of the control subject 13 is identified. There are various methods by which this identification may be performed and the control subject 13 may have multifarious characteristics, but, in the present embodiment, it will be assumed as previously given that the system is an integration system having a dead time element, and the transfer function model will be assumed to be as follows, with an integration time of 200 sec and a dead time of 50 sec. The transfer function of this control subject is expressed by Equation (1) as P(S).

$$P(S)=(1/200S) \cdot e^{-50S} \quad (1)$$

where the symbol S represents a Laplace operator. The adjustment procedure in respect of a control subject 13 having such a transfer function is described in the description below.

Figure 5:
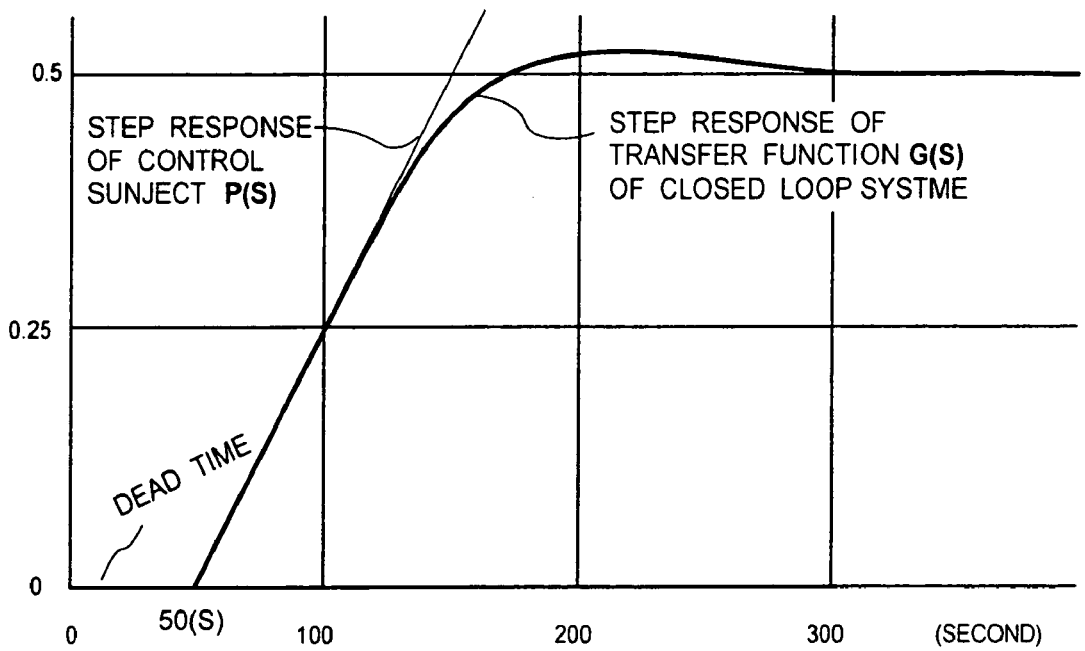
FIG. 5 is a view showing a step response of the control subject with an external compensator according to the present invention.

The transfer function of the transfer function P(S) of this control subject 13 and its parameters are input from the keyboard 4 shown in FIG. 4 and registered. The step response waveform of this transfer function shown in FIG. 5 is then displayed as shown for example by the narrow solid lines on the screen of the CRT (Cathode Ray Tube) 3 shown in FIG. 4 and confirmed (step S01).

Next, adjustment of the compensation parameters of the external compensator 12 is performed. An external compensator 12 wherein the proportional gain element and incomplete differentiation element are expressed by the following model formulae is adopted. The transfer function of this external compensator 12 is represented in equation (2) as F(S).

$$F(S)=Kf \cdot (1+Tf \cdot S)/(1+k \cdot Tf \cdot S) \quad (2)$$

The transfer function G(S) of the closed loop system is then expressed by the following equation (3).

$$G(S)=P(S)/(1+P(S) \cdot G(S)) \quad (3)$$

The compensation parameters, proportional gain Kf and Tf and k in the incomplete differentiation element (1+Tf·S)/(1+k·Tf·S) of this external compensator 12 are adjusted and set to values such that the step response of the transfer function and G(S) of the closed loop system converge in stable fashion and are confirmed by being displayed on the screen of the CRT 3 shown in FIG. 4.

Describing the adjustment procedure of these compensation parameters in further detail, (1) the transfer function G(S) and the parameters thereof of the closed loop system are registered from the keyboard 4 shown in FIG. 4;

(2) the proportional gain Kf is set to 1 and the step response of the transfer function G(S) of the closed loop system is calculated and displayed; and (3) the step response of the transfer function G(S) of the closed loop system is set to the absolute value of the proportional gain Kf so as to produce a prescribed stable system.

For example, it will be assumed that, in an unstable system, the proportional gain Kf=−1. The absolute value of the proportional gain Kf is therefore altered until a stable response is achieved in which a fixed output is obtained in a prescribed time. In an unstable system in which unstable oscillation remains, the overshoot is set to a value such as not to exceed the prescribed range by altering Tf in the incomplete differentiation element from 0 in a range up to one tenth of the time constant of the control subject 13, and the adjustment is repeated while observing the step response waveform displayed on the CRT 3 shown in FIG. 4 (step S02).

Adjustment of the external compensator 12 is taken to be completed (step S03) if a prescribed stable response performance is obtained on evaluating the step response waveform of the transfer function G(S) of this closed loop system.

The step response waveform of the transfer function G(S) of a closed loop system simulated in this way is shown by the thick continuous line in FIG. 5. The vertical axis in FIG. 5 shows the gain and the horizontal axis shows the time (sec); if the step signal changes from 0 to 1 at the time-point 0 (sec), the response of the closed loop system stabilizes after about 300 sec, with a gain of 0.5. The step response waveform of the transfer function P(S) of the control subject 13 may also be displayed in superimposed fashion as shown by the thin continuous line in this Figure.

Empirically, the k in the incomplete differentiation element of the compensation parameter is normally taken as 0.1, Tf in the incomplete differentiation element=0, and the proportional gain Kf=2.

Next, when adjustment of the compensation parameters has been completed, adjustment of the model parameters of the model transfer function Gm(S) of the closed loop system is performed.

This adjustment is performed by adjusting the model parameters of the model transfer function Gm(S) such that the difference of the step response of G(S) of the closed loop system determined at the stage of step S03 described above and the step response of the model transfer function Gm(S) of the closed loop system described in detail below is kept within a prescribed evaluation range.

In this adjustment, the model parameters of the model transfer function Gm(S) are adjusted (step S04, step S05) such that the prescribed response performance is obtained, by starting up the second program to register the model transfer function Gm(S) of the closed loop system and its model parameters, calculating the step response, displaying the result on the CRT 3 shown in FIG. 4 and, furthermore, displaying the transfer function Gm(S) step response based on the compensation parameters of the external compensator 13 found at the stage of step S03 in superimposed fashion, and evaluating the difference of these step responses in accordance with a prescribed evaluation standard.

The details of this procedure will now be described. The model transfer function Gm(S) is defined by the first-order delay and dead time from control theory based on the construction of the control system of this process control device, as shown by the following equation (4).

$$Gm(S)=Kp/((1+TpS)\cdot e^{-LpS}) \quad (4)$$

where Kp is the steady gain, Tp is the first-order delay time constant and Lp is the dead time.

The adjustment procedure is described below with reference to FIG. 6. The step response of the transfer function G(S) of the closed loop system described above is displayed with a thick continuous line on the screen of the CRT 3 shown in FIG. 4, the model transfer function Gm(S) and its model parameters are registered, and the step response waveform of the model transfer function Gm(S) is displayed with for example a broken line so that it may be identified superimposed on the transfer function G(S) of the closed loop.

Figure 6:
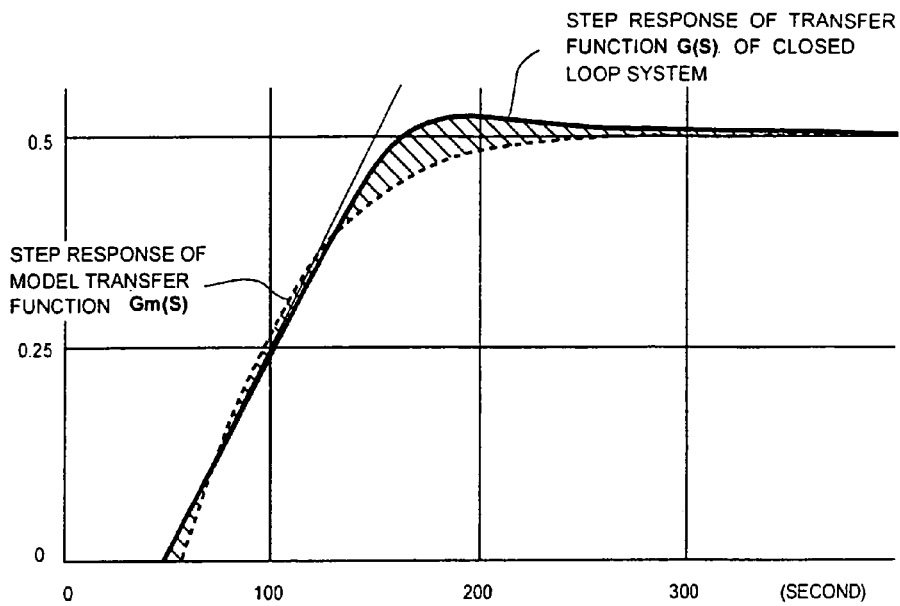
FIG. 6 is a view given in explanation of a method of adjustment of a closed loop system according to the present invention.

At this point, taking the steady gain (stationary gain) Kp, the first-order delay time constant Tp and the dead time Lp of the model parameters as respectively 0.5, 50 (sec) and 60 (sec), these are set (step S04) to values such that the difference between the step response of the transfer function G(S) of the closed loop system and the response waveform of the model transfer function Gm(S) shown as the hatched section of FIG. 6 becomes small in area.

This difference is evaluated quantitatively by for example the IAE (Integral of Absolute Value of Error), which is a method of evaluating a control characteristic. In the case of this example, the portion indicated by the hatching in FIG. 6 shows the difference of the response waveforms. The vertical axis and horizontal axis in this Figure are to the same scale as in FIG. 5. This adjustment is deemed to be completed when this difference is within the prescribed standard range (step S05).

When the above adjustment is completed, the model parameters set in step S05 are set as the control parameters of the controller 11 by performing a prescribed conversion (step S06) and the transfer function of the entire control system of the process control device shown in FIG. 1 is registered, the step response is calculated and displayed and it is confirmed that this step response is within the evaluation standard range. This adjustment is completed if this step response is in the prescribed range (step S07).

If the step response is outside the prescribed range, the compensation parameters of the external compensator 12 and the model parameters of the model transfer function Gm(S) are again readjusted.

Figure 7:
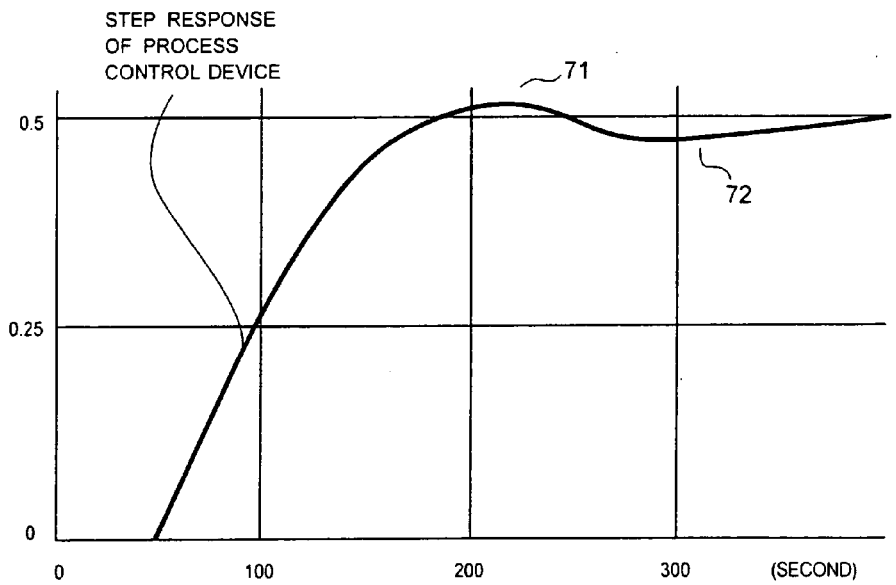
FIG. 7 is a view showing the step response of a process control device adjusted in accordance with the present invention.

FIG. 7 shows a screen display of the CRT 3 shown in FIG. 4 of the step response of the entire control system of the process control device using the model parameters set in the controller 11 and the compensation parameters of the external compensator 12 set at the stage of step S05 described above on starting up the third program.

In this Figure, the vertical axis represents the gain and the horizontal axis represents the time. The change in the control value which is the output thereof is shown when, at time-point 0, a step signal (target value) changing from 0 to 1 is applied to this process control system. As a result of adjusting the compensation parameters of the external compensator 12 and the model parameters of the model transfer function Gm(S) as described above, an overshoot 71 and undershoot 72 relative to the stable value are generated.

Figure 8:
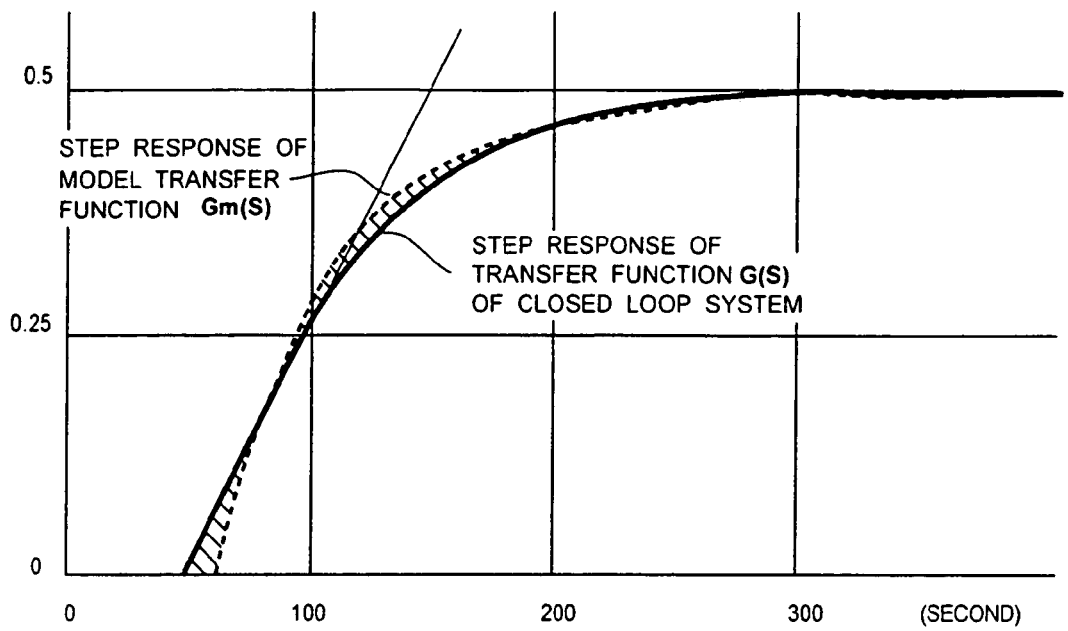
FIG. 8 is a view showing the step response of a model transfer function after readjustment according to the present invention.
Figure 9:
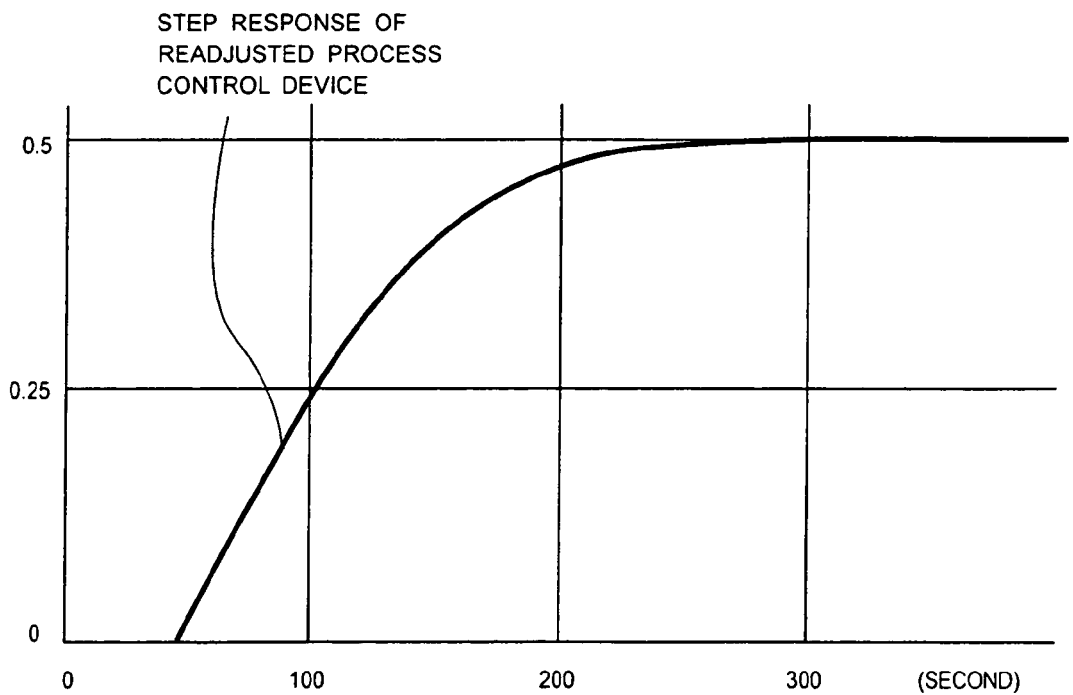
FIG. 9 is a view showing the step response of a process control device that has thus been readjusted.

Accordingly, in order to reduce this oscillation, the compensation parameters and model parameters are readjusted. The results of the readjustment are shown in FIG. 8 and FIG. 9. The thick continuous line in FIG. 8 shows the control characteristic when Tf from 0 to 10 (sec) in the incomplete differentiation element, proportional gain Kf=2, and k=0.1 in the incomplete element are set as compensation parameters and there is no overshoot of the closed loop system.

Next, adjustment further to the previous adjustment is effected so as to make the difference even smaller i.e. within the prescribed reference value range or less. The difference is displayed on the screen of the CRT 3 shown in FIG. 4 and is the difference obtained by superimposing the step response waveform of the model transfer function Gm(S) shown by the thick broken line on the step response waveform of the transfer function G(S) of the closed loop system shown with a thick continuous line in FIG. 8, changing the first-order delay time constant Tp from 50 (sec) to 45 (sec) and changing the dead time Lp from 60 (sec) to 65 (sec), so that the model parameters are: steady gain Kp=0.5, first-order time constant Tp=45 (sec) and dead time Lp=65 sec. A quantitative evaluation was conducted using for example the IAE (Integral of Absolute Value of Error) method described above as the evaluation standard.

As a result, the control response of the process control device as a whole may be adjusted to a step response characteristic with no overshoot as shown in FIG. 9.

Consequently, with this embodiment, since the step response waveform is displayed on the CRT 3 shown in FIG. 4, changes in the control characteristic produced by changes in the compensation parameters and the model parameters may be visualized and so may easily be grasped.

Also, since evaluation of the control performance may be achieved with a prescribed quantitative evaluation function, a method of adjusting a process control device wherein there is little likelihood of human mistakes or statistical variability and an adjustment tool therefor may be provided.

The information required for adjustment is input from the keyboard 4 shown in FIG. 4 and this information is stored in the memory 2. Also, this information is employed for adjustment and calculation by the CPU (Central Processing Unit) 1 in accordance with requirements.

As described above, according to the present invention, a closed loop system comprising a control subject and an external compensator is defined by a transfer function expressed by a first-order delay and dead time and there are provided a method of adjusting a process control device and an adjustment tool therefor whereby the step responses of the control elements of a process control device that exercises control by means of a controller comprising a positive feedback compensator and the transfer function of the control system are made visible and displayed in superimposed manner, so that the difference of their control characteristics may be quantitatively evaluated, so there is little likelihood of human mistakes or statistical variability.

What is claimed is:

1. A method of adjusting a process control device in which a closed loop system comprising a control subject and an external compensator is approximated by a transfer function expressed by a first-order delay and a dead time and said approximated closed loop system is controlled by a controller, said method comprising:

(1) defining said transfer function of said control subject;
   setting a compensation parameter of said external compensator comprising a proportional gain element and an incomplete differentiation element in a range so that a step response of said closed loop system does not diverge or oscillate;
   adjusting said compensation parameter in a first step in which said step response of said closed loop system is displaced as a first response;

(2) setting a model transfer function of said closed loop as a model parameter of said model transfer function comprising a proportional gain element, a dead time and a first-order delay element;

displaying a step response of said model transfer function as a second response superimposed on said first response;

adjusting said model parameter effected as a second step so that a difference of said first response and said second response is kept within a prescribed evaluation standard range;

(3) setting said controller by performing a prescribed conversion with said model parameter as said control parameter of said controller;

displaying a step response of a process transfer function constituted by said control subject, said external compensator and said controller as a third response; and evaluating a response of said process control device within a prescribed evaluation standard range as a third step;

if said third response exceeds said prescribed evaluation standard range, then readjustment is performed by repeating said first step to said third step so as to bring said third response within said evaluation standard range.

2. An adjustment tool for a process control device having a closed loop system that comprises a control subject and an external compensator is approximated by a transfer function expressed by a first-order delay and a dead time and said approximated closed loop system is controlled by a controller, said adjustment tool comprising:

a program that simulates a step response of said process control device;

a setting unit that sets a parameter whereby simulation is performed by said program; and a display and evaluation unit that displays a step response of said process control device by means of said program and whereby said step response is evaluated, wherein said program, in said closed loop system comprising said control subject and said external compensator, comprises:

a first program that sets a compensation parameter of said external compensator, displays said step response of said closed loop system, and adjusts and evaluates said response performance; and a second program that sets a model transfer function of said closed loop system and a model parameter thereof, displays in superimposed fashion a step response display obtained by said first program and a step response display obtained by said model transfer function, and whereby a difference between a step response obtained by said first program and a step response of said model transfer function is evaluated, wherein said model parameter that was adjusted by said second program is set as a control parameter of said controller by performing a prescribed conversion and a control performance of said process control device is thereby evaluated.

3. An adjustment tool for a process control device having a closed loop system that comprises a control subject and an external compensator is approximated by a transfer function expressed by a first-order delay and a dead time and said approximated closed loop system is controlled by a controller, said adjustment tool comprising:

a program that simulates a step response of said process control device;

a setting unit that sets a parameter whereby simulation is performed by said program; and a display and evaluation unit that displays a step response of said process control device by means of said program and whereby said step response is evaluated, wherein said setting unit comprises:

a first unit for setting a transfer function and a compensation parameter of said external compensator;

a second unit for setting a model transfer function and a model parameter of said closed loop system; and a third unit for setting a transfer function of said process control device and a control parameter of said controller.

4. The adjustment tool according to claim 3, wherein said transfer function of said external compensator is constituted by a proportional gain element and an incomplete differentiation element and said compensation parameters are constituted by a proportional gain and a differentiation time constant of said incomplete differentiation element.

5. The adjustment tool according to claim 3, wherein said model transfer function of said closed loop system is constituted by a proportional gain element, a dead time element and a first-order delay element and said model parameters are constituted by a proportional gain, a dead time and a time constant of said first-order delay.

6. The adjustment tool according to claim 2, wherein said setting unit comprises:

a unit for setting a transfer function and a compensation parameter of said external compensator;

a unit for setting a model transfer function and model parameter of said closed loop system; and a unit for setting a transfer function of said process control device and a control parameter of said controller.

7. The adjustment tool according to claim 6, wherein said transfer function of said external compensator is constituted by a proportional gain element and an incomplete differentiation element, and said compensation parameters are constituted by said proportional gain and a differentiation time constant of said incomplete differentiation element.

8. The adjustment tool according to claim 6, wherein said model transfer function of said closed loop system is constituted by a proportional gain element, a dead time element and a first-order delay element and said model parameters are constituted by a proportional gain, a dead time and a time constant of said first-order delay.

9. A computer readable recording medium on which is recorded a program which when executed by a processor programmed with said program produces adjustment of an external compensator by performing steps comprising:

(1) registering and setting a transfer function of an external compensator, a transfer function of a closed loop system, and compensation parameters thereof;

(2) calculating a step response of said transfer function of said closed loop system and displaying results thereof;

(3) evaluating the step response for determining whether stable response performance is obtained; and (4) if stable response performance is not obtained, iteratively adjusting said external compensator upon receipt of adjusted compensation parameters within a set range until stable response performance in which said step response does not diverge or oscillate is achieved.

10. A computer readable recording medium on which is recorded a program which when executed by a processor programmed with said program produces adjustment of a model transfer function of a closed loop system by performing steps comprising:
(1) registering and setting a model transfer function of a closed loop system and model parameters thereof;
(2) calculating a step response of said model transfer function of said closed loop system and displaying results thereof;
(3) displaying and evaluating a difference between a step response of a transfer function of said closed loop system obtained by a first program programmed to adjust an external compensator of said closed loop system and said step response of said model transfer function obtained in step (2); and
(4) iteratively adjusting said model transfer function upon receipt of adjusted model parameters so that said difference is kept within a prescribed range.

11. A computer readable recording medium on which is recorded a program which when executed by a processor programmed with the program evaluates a control performance of an entire control system of a process control device by performing steps comprising:
(1) registering and setting control parameters of a controller and a transfer function of said process control device;
(2) calculating a step response of said transfer function of said process control device and display of said step response;
(3) displaying and evaluating control performance of said process control device by evaluating said step response; and
(4) iteratively adjusting said control parameters to maintain said step response within a prescribed range.

12. A computer readable recording medium on which is recorded:
a. a first program which when executed by a processor programmed with said first program produces adjustment of an external compensator by performing steps comprising,
(1) registering and setting a transfer function of an external compensator, a transfer function of a closed loop system, and compensation parameters thereof;
(2) calculating a step response of said transfer function of said closed loop system and displaying results thereof;
(3) evaluating the step response for determining whether stable response performance is obtained; and
(4) if stable response performance is not obtained, iteratively adjusting said external compensator upon receipt of adjusted compensation parameters within a set range until stable response performance in which said step response does not diverge or oscillate is achieved;
b. a second program which when executed by a processor programmed with said second program produces adjustment of a model transfer function of a closed loop system by performing steps comprising,
(1) registering and setting a model transfer function of a closed loop system and model parameters thereof,
(2) calculating a step response of said model transfer function of said closed loop system and displaying results thereof,
(3) displaying and evaluating a difference between a step response of a transfer function of said closed loop system obtained by said first program and said step response of said model transfer function obtained by said second program, and
(4) iteratively adjusting said model transfer function upon receipt of adjusted model parameters so that said difference is kept within a prescribed range; and
c. a third program which when executed by a processor programmed with said third program evaluates a control performance of an entire control system of a process control device by performing steps comprising,
(1) registering and setting control parameters of a controller by setting said model parameters as said control parameters by performing a prescribed conversion and a transfer function of said process control device,
(2) calculating a step response of said transfer function of said process control device and display of said step response,
(3) displaying and evaluating control performance of said process control device by evaluating said step response, and
(4) iteratively adjusting said control parameters to maintain said step response within a prescribed range.

13. A process control device in which, in order for a closed loop system comprising a control subject and an external compensator to be approximated by a transfer function expressed by a first-order delay and dead time, a necessary information is input by a keyboard and said information is stored in a memory and said approximated closed loop system is controlled by a controller, wherein
a transfer function of said control subject is defined by a predetermined transfer function;
a compensation parameter of said external compensator comprising a comparison gain element and an incomplete differentiation element is set in a range so that a step response of said closed loop system of said external compensator does not diverge or oscillate and said compensation parameter is adjusted in a first step in which a step response of said closed loop system is displayed as a first response by a display device;
a model transfer function of said closed loop is set as a model parameter of said model transfer function comprising a proportional gain element, a dead time and a first-order delay element, a step response of said model transfer function is displayed by a display device as a second response superimposed on said first response, and adjustment of said model parameter is effected as a second step so that a difference of said first response and said second response is kept within a prescribed evaluation standard range;
said controller is set by performing a prescribed conversion with said model parameter as a control parameter of said controller and a step response of said process transfer function constituted by said control subject, said external compensator and said controller is displayed by a display device as a third response, whether a response of the process control device is within a prescribed evaluation standard range is evaluated as a third step; and
if said third response exceeds said prescribed evaluation standard range, readjustment is performed by repeating said first step to said third step so as to bring said third response within an evaluation standard range.

* * * * *